(12) United States Patent
Lindoff et al.

(10) Patent No.: US 8,929,343 B2
(45) Date of Patent: Jan. 6, 2015

(54) METHOD, COMPUTER PROGRAM, RECEIVER, AND APPARATUS FOR DETERMINING A CHANNEL QUALITY INDEX

(75) Inventors: Bengt Lindoff, Bjärred (SE); Johan Nilsson, Höllviken (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 904 days.

(21) Appl. No.: 12/863,361

(22) PCT Filed: Jan. 19, 2009

(86) PCT No.: PCT/EP2009/050550
§ 371 (c)(1),
(2), (4) Date: Oct. 31, 2010

(87) PCT Pub. No.: WO2009/092689
PCT Pub. Date: Jul. 30, 2009

(65) Prior Publication Data
US 2011/0032908 A1    Feb. 10, 2011

Related U.S. Application Data

(60) Provisional application No. 61/023,394, filed on Jan. 24, 2008.

(30) Foreign Application Priority Data

Jan. 22, 2008 (EP) .................................... 08100738

(51) Int. Cl.
*H04W 4/00*      (2009.01)
*H04B 17/00*     (2006.01)
*H04W 36/14*     (2009.01)

(52) U.S. Cl.
CPC ........... *H04B 17/0077* (2013.01); *H04W 36/14* (2013.01); *H04B 17/006* (2013.01)
USPC ............................ 370/333; 370/348; 370/350

(58) Field of Classification Search
None
See application file for complete search history.

(56) References Cited

U.S. PATENT DOCUMENTS 7,917,164 B2 *   3/2011   Rao ................................ 455/522
2003/0185285 A1   10/2003  Talwar
(Continued)

FOREIGN PATENT DOCUMENTS

WO   2007/062933 A1   6/2007
WO   2007/078084 A    7/2007
(Continued)

OTHER PUBLICATIONS

PCT International Preliminary Report on Patentability, mailed Aug. 5, 2010, in connection with International Application No. PCT/EP2009/050550.

(Continued)

*Primary Examiner* — Kwang B Yao
*Assistant Examiner* — Hardikkumar Patel
(74) *Attorney, Agent, or Firm* — Leffler Intellectual Property Law, PLLC

(57) ABSTRACT

A method for determining a channel quality index in an OFDM receiver is disclosed. The method comprises receiving signals comprising reference signals from a serving cell and reference signals from neighboring cells; determining signal power of the reference signals from the serving cell and signal power of the reference signals from detected neighboring cells; and determining carrier-to-interference ratio to be the ratio between the signal power of the reference signals from the serving cell and the signal power of the reference signals from the detected neighboring cells. Carrier-to-interference ratio is used for adapting physical layer properties and/or for deciding on handover. A computer program and apparatuses for implementing the method are also disclosed.

15 Claims, 2 Drawing Sheets

(56) References Cited

U.S. PATENT DOCUMENTS

| | | | |
|---|---|---|---|
| 2004/0116110 A1* | 6/2004 | Amerga et al. | 455/422.1 |
| 2005/0164644 A1* | 7/2005 | Shinoi et al. | 455/69 |
| 2006/0133549 A1 | 6/2006 | Talwar | |
| 2007/0149242 A1* | 6/2007 | Kim et al. | 455/525 |
| 2007/0253355 A1* | 11/2007 | Hande et al. | 370/328 |

FOREIGN PATENT DOCUMENTS

| | | |
|---|---|---|
| WO | WO 2007078084 A1 * | 7/2007 |
| WO | 2008/058268 A | 5/2008 |

OTHER PUBLICATIONS

European Patent Office Article 94(3) EPC Communication, dated Sep. 8, 2010, in connection with EP Application No. 08100 738.7-1246.

3rd Generation Partnership Project; Technical Specification Group Radio Access Network; Physical layer and Measurements (Release 8) 3GPP TS 36.214, Mobile Competence Centre; 650, Route Des Lucioles; F-06921 Sophia-Antipolis Cedex; France, No. V1.0.0, May 1, 2007, pp. 1-8, XP050380483.

European Search Report, dated Jul. 30, 2008, in connection with International Application No. EP 08 10 0738.

PCT International Search Report, dated May 19, 2009, in connection with International Application No. PCT/EP2009/050550.

Ericsson: "Reference Signal Received Quality, RSRQ measurement" 3GPP TSG-RAN WG1 #49BIS, [Online] Jun. 20, 2007, XP002490044. Retrieved from the internet: URL:http://www.3gpp.org/ftp/tsg%5Fran/WG1%5FRL1/TSGR1%5F49b/Docs/R1-073041.zip.

* cited by examiner

METHOD, COMPUTER PROGRAM, RECEIVER, AND APPARATUS FOR DETERMINING A CHANNEL QUALITY INDEX

CROSS-REFERENCE TO RELATED APPLICATIONS

This application claims priority under 35 U.S.C. § 119 to European Patent Application No. 08100738.7, filed Jan. 22, 2008, which is hereby incorporated herein by reference in its entirety. This application also claims the benefit of U.S. Provisional Application No. 61/023,394, filed Jan. 24, 2008, which is hereby incorporated herein by reference in its entirety.

TECHNICAL FIELD

The present invention relates to a method for determining a channel quality index in a receiver, and computer program, receiver, and apparatus for implementation of the method. In particular, the invention relates to estimation of carrier-to-interference ratio.

BACKGROUND

In the forthcoming evolution of the mobile cellular standards like Global System for Mobile communications (GSM) and Wideband Code Division Multiple Access (WCDMA), new transmission techniques like Orthogonal Frequency Division Multiplexing (OFDM) will be used. Furthermore, in order to have a smooth migration from the existing cellular systems to a new high capacity and high data rate system in existing radio spectrum, the new system will probably have to be able to operate in a flexible bandwidth. A proposal for such a new flexible cellular system is Third Generation Partnership Project Long Term Evolution (3GPP LTE) that can be seen as an evolution of the WCDMA standard. This system will use OFDM as multiple access technique, thus called OFDMA, in the downlink and will be able to operate on bandwidths ranging from 1.25 MHz to 20 MHz. Furthermore, data rates up to 100 Mb/s will be supported for the largest bandwidth, and such data rates will be possible to reach using Multiple-Input-Multiple Output (MIMO) scheme in the down-link. In order to optimize the throughput it is preferable that the terminal estimates the signal-to-interference ratio (SIR) properly, used for feedback of a channel quality index (CQI). Furthermore, it is also preferable to determine whether single or multiple streams, i.e. MIMO, should be transmitted.

Typically SIR used for CQI is estimated by estimating a pilot signal power divided to the total interference and thermal noise power, $$SIR=C/(I+N)$$

where C is pilot signal power, I is interference power, and N is noise power, and then correct the estimate using some possible bias compensation. However, since 3GPP LTE is a packet-based system, the interference level could vary significantly from sub-frame to sub-frame. However, in thermal noise limited scenarios, the interference is almost constant from sub-frame to sub-frame, hence making the CQI estimates more reliable, in terms of that the CQI will be valid for many sub-frames. Standard SIR estimates do not count for the differences between interference and noise making it hard to discriminate between interference and noise.

US 2006/0133549 A1 discloses a method and system for receiving a plurality of transmission signals. The received transmission signals are detected to determine whether they are dominated by noise or interference. If they are dominated by noise, a first set of weights is selected for receiver weighting, and consequently, if they are dominated by interference, a second set of weights is selected. Detection is performed by determining level of correlation between the received transmission signals.

Furthermore, in pre-coding vector computations, used for feedback of pre-coding information to the base station in MIMO schemes, prior art solutions typically computes the pre-coding vectors for single and multiple streams based on prior art SIR estimate which again does not count for whether the noise is interference or thermal noise.

Therefore, there is a need for an estimate of a carrier-to-interference ratio (C/I).

SUMMARY

The present invention is based on the understanding that channel quality can be estimated based on observations of transmitted reference symbols from the serving cell and the detected neighboring cells. The reference symbols are received at a terminal, which then is able to determine channel quality. The inventors have found that by this observation, the terminal will also be able to judge if the channel is interference or noise dominated. The inventors have also realized that a similar observation of a detected neighboring cell can be used for deciding on handover.

According to a first aspect of the present invention, there is provided a method for determining a channel quality index in a receiver, the method comprising receiving signals comprising reference signals from a serving cell and reference signals from neighboring cells;

determining signal power of the reference signals from the serving cell and signal power of the reference signals from detected neighboring cells; and determining carrier-to-interference ratio to be the ratio between the signal power of the reference signals from the serving cell and the signal power of the reference signals from the detected neighboring cells.

Thereby, carrier-to-interference ratio can be determined in an efficient way.

The method may further comprise comparing the determined carrier-to-interference ratio with a first threshold; and if the determined carrier-to-interference is below the first threshold, adapting physical layer properties of the receiver according to a first reception scheme.

This enables an advantageous adaptation of reception to actual signal conditions.

The method may further comprise comparing the determined carrier-to-interference ratio with a second threshold; and if the determined carrier-to-interference is above the second threshold, adapting physical layer properties of the receiver according to a second reception scheme.

This enables an advantageous adaptation of reception to actual signal conditions.

Any of the first and second thresholds may be a function of an estimated signal-to-interference ratio, or a predetermined value.

Any of these alternatives enables a proper selection of parameters for the adaptation mechanism.

The method may be performed for each sub-band of the received signals, or be performed for overlapping sub-bands of the reference signals from a serving cell and reference signals from detected neighboring cells.

Any of these alternatives provides an approach for efficient determination of an carrier-to-interference ratio in sub-band-based communication systems.

The method may further comprise determining carrier-to-interference ratio for a first neighboring cell to be the ratio between the signal power of the reference signals from the first neighboring cell and the signal power of the reference signals from the other cells; and deciding on handover to the first neighboring cell based on the carrier-to-interference ratio of the first neighboring cell.

This approach provides further use of the approach of the present invention in handling communication in a cellular communication system.

According to a second aspect of the present invention, there is provided a computer program comprising instructions, which when executed by a processor are arranged to cause the processor to perform the method according the first aspect of the present invention.

This enables an efficient implementation, which shows essentially the same advantages as those demonstrated for the first aspect of the present invention.

According to a third aspect of the present invention, there is provided a receiver comprising means for receiving signals comprising reference signals from a serving cell and reference signals from neighboring cells;

means for determining signal power of the reference signals from the serving cell and signal power of the reference signals from detected neighboring cells; and means for determining carrier-to-interference ratio to be the ratio between the signal power of the reference signals from the serving cell and the signal power of the reference signals from the detected neighboring cells.

Thus, a receiver having abilities for efficient carrier-to-interference ratio determination is provided.

The receiver may further comprise means for comparing the determined carrier-to-interference ratio with a first threshold, wherein the receiver is arranged to adapt physical layer properties according to a first reception scheme if the determined carrier-to-interference is below the first threshold.

This enables the receiver to adapt to actual signal conditions.

The receiver may further comprise means for comparing the determined carrier-to-interference ratio with a second threshold, wherein the receiver is arranged to adapt physical layer properties according to a second reception scheme if the determined carrier-to-interference is above the second threshold This enables the receiver to adapt to actual signal conditions.

Any of the first and second thresholds used by the receiver may be a function of an estimated signal-to-interference ratio, or a predetermined value.

The carrier-to-interference may be determined for each sub-band of the received signals, or for overlapping sub-bands of the reference signals from a serving cell and reference signals from detected neighboring cells, by the receiver.

The receiver may further comprise means for determining carrier-to-interference ratio for a first neighboring cell to be the ratio between the signal power of the reference signals from the first neighboring cell and the signal power of the reference signals from the other cells; and means for deciding on handover to the first neighboring cell based on the carrier-to-interference ratio of the first neighboring cell.

Thus, a receiver is provided which is able to also use the general approach of the present invention for handling its communication in a cellular communication system.

According to a fourth aspect of the present invention, there is provided an apparatus comprising a receiver arranged to receive signals comprising reference signals from a serving cell and reference signals from neighboring cells;

a signal power estimator arranged to estimate signal power of the reference signals from the serving cell and signal power of the reference signals from detected neighboring cells; and a carrier-to-interference ratio calculator arranged to determine carrier-to interference to be the ratio between the signal power of the reference signals from the serving cell and the signal power of the reference signals from the detected neighboring cells.

Thus, an apparatus for communication in a cellular communication system is provided, which benefits from the advantageous determination of carrier-to-interference ratio calculation of the present invention. The apparatus may for example be a mobile phone, a cellular communication unit for use with a general purpose computer, e.g. a personal computer, or another communication device for equipment benefiting from having capabilities for communication in a cellular communication network, such as vending machines, surveillance equipment, military, industrial or construction equipment, or gaming devices.

The apparatus may further comprise a comparator arranged to compare the determined carrier-to-interference ratio with a first threshold, wherein the receiver is arranged to adapt physical layer properties according to a first reception scheme if the determined carrier-to-interference is below the first threshold.

The apparatus is thus enabled to adapt to existing signal environment.

The apparatus may further comprise a comparator arranged to compare the determined carrier-to-interference ratio with a second threshold, wherein the receiver is arranged to adapt physical layer properties according to a second reception scheme if the determined carrier-to-interference is above the second threshold.

The apparatus is thus enabled to adapt to existing signal environment.

Any of the first and second threshold used by the apparatus may be a function of an estimated signal-to-interference ratio, or a predetermined value.

The carrier-to-interference calculator may be arranged to determine carrier-to-interference for each sub-band of the received signals, or for overlapping sub-bands of the reference signals from a serving cell and reference signals from detected neighboring cells.

The apparatus may further comprise a neighbor cell carrier-to-interference calculator arranged to determine carrier-to-interference ratio for a first neighboring cell to be the ratio between the signal power of the reference signals from the first neighboring cell and the signal power of the reference signals from the other cells; and a handover handler arranged to decide on handover to the first neighboring cell based on the carrier-to-interference ratio of the first neighboring cell.

This provides the apparatus with further capabilities based on the approach of efficiently determining carrier-to-interference ratio of the present invention.

DETAILED DESCRIPTION

Figure 1:
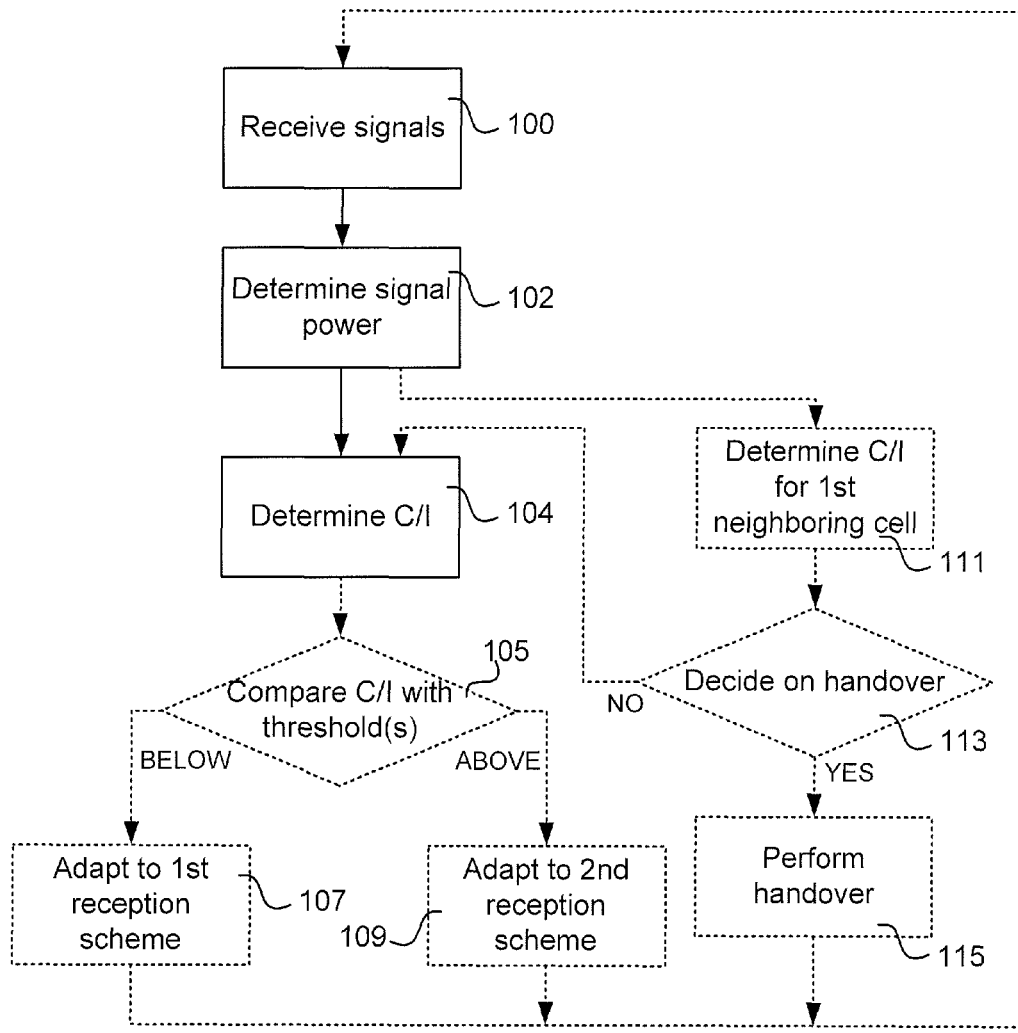
FIG. 1 is a flow chart illustrating a method according to an embodiment of the present invention.

FIG. 1 is a flow chart illustrating a method according to an embodiment of the present invention. Signals comprising reference signals from a serving cell and reference signals from neighboring cells are received in a reception step 100, as well as noise and signals from undetected neighboring cells. The received signals are processed to enable determination of signal power in a signal power determination step 102. Thus, signal power for the reference signals, Received Signal Reference Power (RSRP), from a serving cell $RSRP_{sc}$, and signal power for the reference signals from detected neighboring cell $RSRP_{nc}$ are determined, or at least values indicative of $RSRP_{sc}$ and $RSRP_{nc}$, respectively. From this, an estimate of carrier-to-interference ratio (C/I) is determined in a C/I determination step 104 as $$C/I = RSRP_{sc}/RSRP_{nc},$$

or as a quota between values indicative of the respective signal powers of the reference signals.

The estimation of C/I can be used to adapt physical algorithms such as SIR estimation and pre-coding vector indication (PCI) computations for MIMO. In LTE, for mobility reasons, the RSRP is derived, on a regular basis (say one every 20-50 ms) for the serving cell as well as for all detected neighboring cells. Since the reference signals are always transmitted, regardless of data transmission (i.e. whether the cell is full or empty) the ratio between the serving cell RSRP and all the sum over all detected cells RSRP gives an indication of C/I and then whether there are any strong interfering cells that could give rise to bursty noise term. Mathematically the ratio can be described as $$C/I = \frac{\sum_{i=1}^{M} |\hat{h}_i|^2}{\sum_{j=1}^{N} \sum_{i=1}^{M} |\hat{h}_i^j|^2}$$

where $|\hat{h}_i^j|^2$ means the signal power for reference signal i for detected neighbor cell j, assuming N detected neighboring cells are detected, M is the number of reference signals, and $|\hat{h}_i|^2$ means the signal power for reference signal i for the serving cell.

In principle, the relation between SIR and C/I is $$SIR = \frac{C}{I+N}$$

where C is carrier power, I is interference power, and N is noise power. As noise power can never be negative, C/I is always at least as large as SIR. The C/I could then be compared to standard SIR estimates. If C/I≈SIR, i.e. not much noise is present, then this indicates interference limited scenarios. For this, the receiver can be adapted to a reception scheme being adapted for an interference limited channel. Due to the bursty interference nature of LTE, the SIR used for CQI is preferably not averaged. If on the other side C/I is large compared to SIR, i.e. noise is dominating or at least not negligible, then the system is thermal noise limited. For this, the receiver can be adapted to a reception scheme being adapted for an noise limited channel. Hence longer average of the SIR snap shots for CQI can be used, advantageously in order to reduce the variance in the SIR estimates. With respect to the PCI, a large C/I which indicates a thermal noise limited system, makes it more probable that multi-stream modulation and coding is possible, hence more accurate PCI derivations focusing on MIMO could be done.

For determining which of the two cases elucidated above that is applicable, the C/I can be compared with a threshold, or alternatively with two thresholds, each depending on which case has been determined historically, i.e. which of the cases that is the determined case up to the new decision. The use of two thresholds may be used for providing a hysteresis for relieving processing means of a receiver compared to using a single threshold, for the situation where both the cases are about equally applicable. The receiver then does not have to toggle between the reception schemes, resulting in repeated re-calculations. The comparison can be performed by comparison means, such as a comparator, or be a function implemented in software. The use of one threshold could be regarded as setting the two thresholds equal.

In another embodiment, the C/I could be estimated and compared to SIR, using the technique above in different sub-bands. In LTE, different cells could have different bandwidths, and it could happen that detected neighboring cells have smaller bandwidths than the serving cell. Then C/I estimates in different sub-bands give indications if so is the case and hence, give information to the physical layer algorithms to adapt the algorithms to interference or thermal noise limited in the different sub-bands.

In yet another embodiment, the C/I itself, without comparison to the SIR estimate could be used as an indication about if the terminal is interference or noise limited. If C/I is large, then this indicates noise limited scenarios, and if C/I is small, that indicates interference-limited scenario.

These embodiments are illustrated by optional steps 105-109, wherein a comparison step 105 compares the determined C/I with a threshold, which can be determined from an estimated SIR, as demonstrated above, or the threshold can be a predetermined threshold, as also demonstrated above. Further as demonstrated above, this can be done for the entire bandwidth, or for appropriate sub-bands. If C/I is below the threshold, the receiver is adapted according to one reception scheme formed to handle an interference-limited scenario in a first reception scheme adaptation step 107. On the other hand, if C/I is above, or possibly equal to the threshold, the receiver is adapted according to another reception scheme formed to handle a noise-limited scenario in a second reception scheme adaptation step 109. As discussed above, the method is preferably repeated on a regularly basis, and the procedure preferably returns to the reception step 100.

In yet another embodiment, the C/I could be determined for both serving cell as well as the detected neighboring cells, hence C/I could be used for mobility and hence trig Handovers. This embodiment is illustrated by optional steps 111-115. In a neighboring cell C/I determination step 111, C/I is determined for a detected neighboring cell, whereby decision on handover to this cell can be made in a handover decision step 113. Handover decision can be based on comparison of C/I for serving cell with C/I for a detected neighboring cell in question, and if C/I for the neighboring cell in question is larger than C/I for the serving cell, a handover is triggered. If handover is decided to take place, the handover is preferably performed in a handover step 115, and the procedure then returns to the reception step 100. On the other hand, if decision is that no handover is to take place, the procedure continues, preferably with the C/I determination step for the serving cell, if this has not already taken place before or in parallel with the neighboring cell C/I determination step 111.

The groups comprising the optional steps 105-109 and optional steps 111-115, respectively, can be used independently, or in combination.

Figure 2:
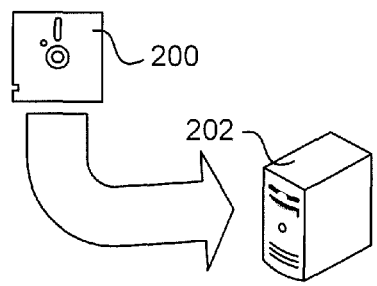
FIG. 2 schematically illustrates a computer readable medium which is loadable and executable on a processor.

FIG. 2 is a schematic illustration of a computer readable medium according to an embodiment of the present invention. The method is implementable with aid of hardware in an apparatus, and preferable with aid of software. Thus, the CQI estimation function is suitable for implementation with aid of processing means, such as general, signal, and/or image processors. The computer program preferably comprises program code, as illustrated in FIG. 2, which is stored on a computer readable medium 200, which can be loaded and executed by a processing means 202 to cause it to perform the above described method comprising receiving signals present in a frequency range, preferably transforming received signals into frequency domain, determining signal power of reference signals from the received signals, and determining C/I as described above.

The program code can further cause the processing means to compare the determined C/I with a threshold, wherein the threshold can be determined by the processing means according to any of the embodiments of the method described above, and then the processing means can provide a proper reception scheme to the receiver as also described above. The program code can further, or alternatively cause the processor to perform determination of C/I for any of the detected neighboring cells, on which the processor is able to make a decision on handover, and provide control for performing handover if that is the outcome of the decision.

The processing means 202 and computer program product 200 can be arranged to execute the program code sequentially where actions are performed stepwise, but mostly be arranged to execute the program code on a real-time basis where actions are performed upon need and availability of data. The processing means 202 is preferably what normally is referred to as an embedded system. Thus, the depicted computer readable medium 200 and processing means 202 in FIG. 2 should be construed to be for illustrative purposes only to provide understanding of the principle, and not to be construed as any direct illustration of the elements.

Figure 3:
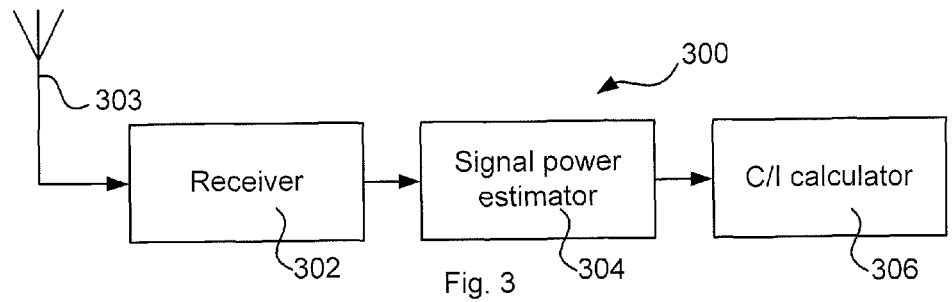
FIG. 3 is a block diagram schematically illustrating an apparatus according to an embodiment of the present invention.

FIG. 3 is a block diagram schematically illustrating an apparatus 300 according to an embodiment of the present invention. The apparatus 300 comprises a receiver 302, which is arranged to receive signals through an antenna 303. The signals comprises, besides other signals, such as signals of transmitted data, reference signals, e.g. pilot symbols. From these reference signals, which are provided to a signal power estimator 304, the signal power estimator 304 determines signal power of the reference signals from a serving cell as well as from detected neighboring cells. The determined signal powers are provided to a C/I calculator 306, which determines C/I as a ratio between the signal power of the serving cell's reference signals and the signal power of the detected neighboring cells' reference signals. As described with reference to FIG. 1, C/I can optionally also be determined for any of the detected neighboring cells in a similar way by the C/I calculator such that the detected neighboring cell's C/I can be used for decision on handover to this neighboring cell. Additionally, or alternatively to this option, the determined C/I for the serving cell can optionally be used for optimizing the receiver 302 by determining if the channel is interference limited or noise limited. This is preferably performed as for any of the embodiments of the method described with reference to FIG. 1. This is preferably performed by the receiver 302, or by a controller (not shown) of the apparatus 300.

Figure 4:
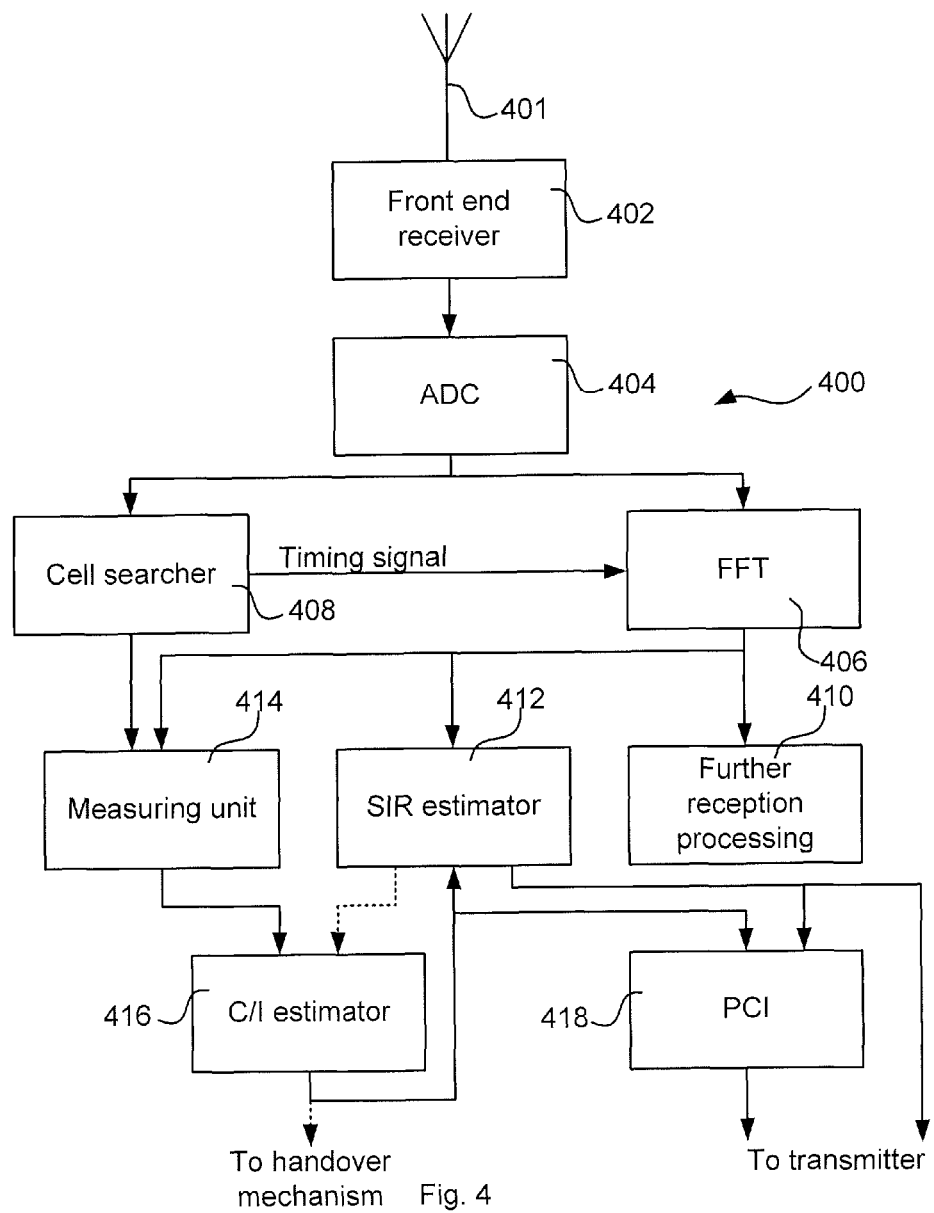
FIG. 4 is a block diagram illustrating an apparatus according to an embodiment of the present invention.

FIG. 4 is a block diagram illustrating an apparatus 400 according to an embodiment of the present invention. The apparatus 400 comprises a front-end receiver 402 arranged to receive signals through an antenna arrangement 401. The received signals are converted into digital format by an analog-to-digital converter 404. The digital signals are provided to a fast Fourier transformer (FFT) 406 and to a cell searcher 408. The FFT 406 provides transformed signals, which can be seen as a division of the signal into a multitude of sub-bands. The FFT 406 can be aided with a timing signal provided by the cell searcher 408, which collects information on a serving cell and detected neighboring cells. The cell searcher 408 can give timing for the serving cell, detect new neighboring cells, and give timing for already detected neighboring cells. The transformed signals are provided for further processing, i.e. to extract the desired transmitted information, illustrated by box 410. The transformed signals are also provided to a SIR estimator 412, which is arranged to estimate signal-to-interference ratio of the signals, which can be performed in traditional way. The estimated SIR is provided to several functions of the apparatus 400, such as to control transmission (not shown). Further, the transformed signals are provided to a measuring unit 414, which is arranged to measure power of reference signals of the serving cell and the detected neighboring cells. For this, the measuring unit 414 also receives information on the serving cell and the detected neighboring cells from the cell searcher 408. The measured power values are provided to a C/I estimator 416, which determines C/I estimates e.g. for the serving cell by calculating a ratio between the signal power of reference signals from the serving cell and the signal power of reference signal from detected neighboring cells. The C/I estimate for the serving cell can be provided to the SIR estimator to be used for SIR estimation. The C/I estimate can also be provided to a pre-coding vector indication computations unit 418, used for feedback of pre-coding information to a base station in MIMO schemes. This is typically computed for single and multiple streams based on SIR estimate provided from the SIR estimator 412, which does not count for whether the noise is interference or thermal noise. By taking into account also the estimated C/I, pre-coding information can be improved by taking into account the channel limitation being dominated by interference or noise. The C/I estimator can in a similar way calculate C/I estimates for any of the detected neighboring cells, which enables provision of these estimates to handover mechanisms (not shown). Further, the C/I estimator 416 can be provided with the SIR estimate from the SIR estimator 412, whereby the estimated C/I and SIR can be compared to determine if the channel limitation is noise or interference dominated, as demonstrated above.

The invention claimed is:
1. A method for determining a channel quality index in a receiver, the method comprising:
    receiving signals comprising reference signals from a serving cell and reference signals from neighboring cells;
    determining signal power of the reference signals from the serving cell and signal power of the reference signals from detected neighboring cells;
    determining carrier-to-interference ratio to be a ratio between the signal power of the reference signals from the serving cell and the signal power of the reference signals from the detected neighboring cells;

producing an estimated signal-to-interference ratio by estimating a signal-to-interference ratio representing signal power divided by total interference and thermal noise power;
determining a second threshold based on the estimated signal-to-interference ratio;
comparing the determined carrier-to-interference ratio with the second threshold; and
based on whether the determined carrier-to-interference ratio is above the second threshold, adapting physical layer properties of the receiver according to a second reception scheme.

2. The method according to claim 1, further comprising:
comparing the determined carrier-to-interference ratio with a first threshold; and
based on whether the determined carrier-to-interference ratio is below the first threshold, adapting physical layer properties of the receiver according to a first reception scheme.

3. The method according to claim 2, wherein the first threshold is a function of the estimated signal-to-interference ratio.

4. The method according to claim 2, wherein the first threshold is a predetermined value.

5. The method according to claim 1, being performed for each sub-band of the received signals.

6. The method according to claim 1, being performed for overlapping sub-bands of the reference signals from a serving cell and reference signals from detected neighboring cells.

7. The method according to claim 1, further comprising:
determining carrier-to-interference ratio for a first neighboring cell to be the ratio between the signal power of the reference signals from the first neighboring cell and the signal power of the reference signals from the other cells; and
deciding on handover to the first neighboring cell based on the carrier-to- interference ratio of the first neighboring cell.

8. A non-transitory computer readable storage medium having stored therein a computer program comprising instructions, which when executed by a processor are arranged to cause the processor to perform a method for determining a channel quality index in a receiver, the method comprising:
receiving signals comprising reference signals from a serving cell and reference signals from neighboring cells;
determining signal power of the reference signals from the serving cell and signal power of the reference signals from detected neighboring cells;
determining carrier-to-interference ratio to be a ratio between the signal power of the reference signals from the serving cell and the signal power of the reference signals from the detected neighboring cells;
producing an estimated signal-to-interference ratio by estimating a signal-to-interference ratio representing signal power divided by total interference and thermal noise power;
determining a second threshold based on the estimated signal-to-interference ratio;
comparing the determined carrier-to-interference ratio with the second threshold; and
based on whether the determined carrier-to-interference ratio is above the second threshold, adapting physical layer properties of the receiver according to a second reception scheme.

9. A receiver comprising:
means for receiving signals comprising reference signals from a serving cell and reference signals from neighboring cells;
means for determining signal power of the reference signals from the serving cell and signal power of the reference signals from detected neighboring cells;
means for determining carrier-to-interference ratio to be a ratio between the signal power of the reference signals from the serving cell and the signal power of the reference signals from the detected neighboring cells;
means for producing an estimated signal-to-interference ratio by estimating a signal-to-interference ratio representing signal power divided by total interference and thermal noise power;
means for determining a second threshold based on the estimated signal-to-interference ratio; and
means for comparing the determined carrier-to-interference ratio with the second threshold, wherein the receiver is arranged to adapt physical layer properties according to a second reception scheme based on whether the determined carrier-to-interference ratio is above the second threshold.

10. The receiver according to claim 9, further comprising:
means for comparing the determined carrier-to-interference ratio with a first threshold, wherein the receiver is arranged to adapt physical layer properties according to a first reception scheme based on whether the determined carrier-to-interference ratio is below the first threshold.

11. The receiver according to claim 10, wherein the first threshold is a function of the estimated signal-to-interference ratio.

12. The receiver according to claim 10, wherein the first threshold is a predetermined value.

13. The receiver according to claim 9, wherein carrier-to-interference ratio is determined for each sub-band of the received signals.

14. The receiver according to claim 9, wherein carrier-to-interference ratio is determined for overlapping sub-bands of the reference signals from a serving cell and reference signals from detected neighboring cells.

15. The receiver according to claim 9, further comprising:
means for determining carrier-to-interference ratio for a first neighboring cell to be the ratio between the signal power of the reference signals from the first neighboring cell and the signal power of the reference signals from the other cells; and
means for deciding on handover to the first neighboring cell based on the carrier-to-interference ratio of the first neighboring cell.

* * * * *